United States Patent [19]
Fiala

[11] 4,449,495
[45] May 22, 1984

[54] ENGINE WITH AUTOMATIC CUT-OFF DEVICE

[75] Inventor: Ernst Fiala, Wolfsburg, Fed. Rep. of Germany

[73] Assignee: Volkswagenwerk Aktiengesellschaft, Wolfsburg, Fed. Rep. of Germany

[21] Appl. No.: 281,231

[22] Filed: Jul. 6, 1981

[30] Foreign Application Priority Data

Jul. 5, 1980 [DE] Fed. Rep. of Germany ....... 3025539

[51] Int. Cl.³ .............................................. F02B 75/12
[52] U.S. Cl. .......................... 123/198 DB; 123/198 F; 123/198 DC; 123/179 K
[58] Field of Search ........ 123/198 F, 198 DB, 179 K, 123/198 DC, 179 B

[56] References Cited

U.S. PATENT DOCUMENTS

| | | | |
|---|---|---|---|
| 2,757,651 | 8/1956 | Wenklen | 123/198 F |
| 4,022,164 | 5/1977 | Fuchs | 123/198 F |
| 4,153,033 | 5/1979 | Lizuka | 123/198 F |
| 4,192,279 | 3/1980 | Maisch et al. | 123/198 F |
| 4,371,050 | 2/1983 | Ikeura | 123/198 DB |

*Primary Examiner*—Ira S. Lazarus
*Attorney, Agent, or Firm*—Brumbaugh, Graves, Donohue & Raymond

[57] ABSTRACT

A vehicle is equipped with an engine, a transmission and a control device for cutting off the engine. This control device is actuated as a function of the position of the gearshift lever.

7 Claims, 2 Drawing Figures

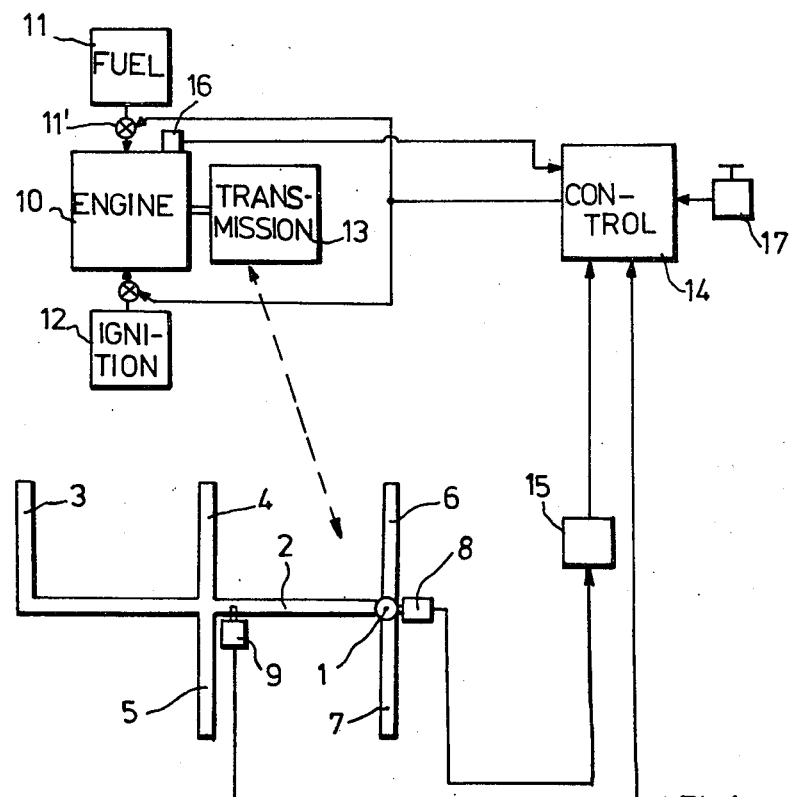
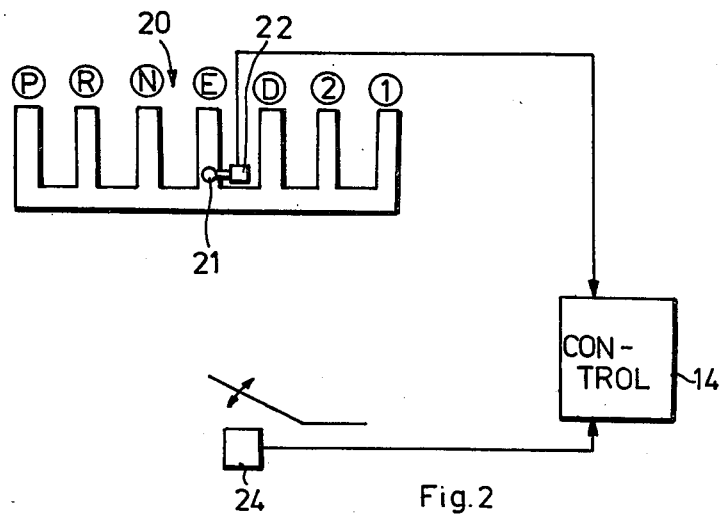

ENGINE WITH AUTOMATIC CUT-OFF DEVICE

BACKGROUND OF THE INVENTION

The present invention concerns a vehicle and, more particularly, an automobile with an engine having a control device for automatically cutting it off.

Vehicles with engine cut-off control devices have been proposed in the past. Such a control device is typically constituted, e.g., by switches which can be actuated by the operator. When this switch is actuated, e.g., at a red traffic light, the driving engine is cut off in order to avoid unnecessary fuel consumption and to decrease the noxious substances emitted into the atmosphere by the vehicle. This cut off of the engine may be accomplished by interrupting the engine's connection to the ignition and/or the fuel supply. However, to use this device, the operator must consciously elect to do so and must be continuously alert to the need to do so.

SUMMARY OF THE INVENTION

It is the object of the present invention to create a vehicle in which the cutting off of the engine is obtained essentially automatically, but only in clearly defined operating states such as, e.g., during a stop at a traffic light or the like. This object is achieved by utilizing a control device capable of cutting off the engine and actuating this control device in dependance on the position of the vehicle transmission gear shift lever.

In an illustrative embodiment of the invention a vehicle is equipped with an internal combustion engine and a transmission, either manual or automatic. The position of the conventional gear shift or selector lever of the transmission is sensed and a signal based on this position is used to actuate a control device capable of cutting off the engine. Due to the fact that the actuation of the control device for disconnection, i.e., cutting off, of the driving engine is rendered dependent upon the position of the gearshift or selector lever, a simple automatic engine cut-off process is created, whereby the driving engine is stopped at meaningful times.

In accordance with a further refinement of the invention, the control device of a vehicle equipped with a manually-operated transmission is designed in such a manner that it can be actuated for stopping the driving engine when the gearshift lever is in the neutral position. With such an arrangement it may be useful for the actuation of the control device to occur only after the gearshift lever has remained in the neutral position for a minimum period of time. This minimum time period, which may be one or two seconds, is provided so that the ordinary shifting processes, even if carried out slowly, does not lead automatically to a cutting off of the engine.

Another embodiment requires that the actuation of the engine cut-off device depend on the engine or outside temperature, whereby cutting off of the engine can occur only after it has attained its normal operating temperature. Moreover, there may be provided a manually operable switch which must be actuated before engine disconnection can be carried out.

In a still further embodiment the control device may be rendered in such a manner that on displacement of the gearshift lever from the neutral position, the control device is deactivated so as to permit renewed starting of the driving engine. In another embodiment, renewed starting of the engine may be provided only upon displacement of the gearshift lever into the shift path associated with the first and the second gears.

BRIEF DESCRIPTION OF THE DRAWINGS

The foregoing and other features of the present invention will be more readily apparent from the following detailed description of an illustrative embodiment thereof taken in conjunction with the drawings wherein:

FIG. 1 is a schematic representation of a shift pattern of a conventional four-gear manual transmission associated with an internal combustion engine equipped with the present invention; and FIG. 2 is an illustration of the present invention utilized with an automatic transmission.

DESCRIPTION OF ILLUSTRATIVE EMBODIMENTS

A manual gearshift lever 1 associated with a transmission 13 of an internal combustion engine 10 is shown in the neutral position in FIG. 1. The neutral position is located in an idling path 2 between the levels of shift paths 6 and 7 associated with the third and fourth gears, respectively, and is held there, e.g., by springs. A shift path 3 is associated with the reverse gear, while the paths 4 and 5 are associated with the first and second forward gears, respectively.

A switch 8 is actuated when the gearshift lever is in its neutral position, and a switch 9 is actuated when the gearshift lever 1 is displaced into the shift paths 3, 4 and 5 associated with the reverse, first and second gears. The switches 8 and 9 form part of a control device 14 for cutting off the driving engine 10 by disconnecting the ignition 12 and/or the fuel supply 11 from the driving engine 10. With respect to the fuel supply, this is accomplished by operating the idling cut-off valve 11'. The switch 8 may be followed by a time-delay device 15 which forwards the signal for cutting off the driving engine only if the switch has been actuated by the gearshift lever 1 for more than a minimum period of time, e.g., one or two seconds. In addition, there may be provided a temperature-dependent switch 16 which, below a predefined temperature such as the operating temperature of the engine, prevents the cut off of the engine. Furthermore, a manual switch 17 may be arranged for operation by the driver of the vehicle so that the engine cut-off device cannot be activated at all. As long as the manual switch 17 has not been actuated, an engine cut-off is thus prevented.

If a vehicle equipped with a control device in accordance with the invention is used, a cutting off of the engine occurs whenever the gearshift lever is in the neutral position for more than a minimum period of time equal to approximately one or two seconds. Thus, if a previously shifted gear of the vehicle is disengaged during operation of the vehicle in city traffic, e.g., while the vehicle is at a red light, and the gearshift lever is in the idling position, the engine will be cut off automatically as soon as the predefined time interval is exceeded.

Two possibilities exist for restarting the engine. First the switch arranged in the neutral position of the gearshift lever can be designed to assure that upon displacement of the gearshift lever 1 from the neutral position, a restarting of the driving engine through a corresponding actuation of the starter motor (not shown) will occur. Alternatively, the second switch 9 can be arranged so that it is actuated upon displacement of the gearshift lever 1 into the shift paths 3, 4 or 5, which are associated with the reverse, first or second gears, respectively. The switch 9 can then likewise actuate the starter motor for restarting the driving engine.

In the former case, restarting of the engine by means of the starter motor will occur on each displacement of the gearshift lever, but in the latter case such restarting will occur only during the subsequent engagement of the first, second or reverse gears. If the third or fourth gears are engaged directly after neutral, which may occur, e.g., while the vehicle is moving, the driving engine is started due to the kinetic energy of the vehicle mass when the clutch is engaged, and not due to the starter motor. The device also offers the possibility for the automatic cutting off of the engine by means of disengagement of the gear, e.g., during travel over extended mountainous terrain, whereby engine braking is not required. Here again considerable savings in fuel can be attained.

The engine cut-off control process during stopping and deceleration can also be carried out by vehicles equipped with automatic transmissions, as shown in FIG. 2. In such a case, a special additional position identified, e.g., as position "E" is associated with the gearshift lever 21 of gear selector 20. Only in position E does the automatic disconnection of the engine occur. To accomplish this a switch 22 is associated with position E so that the control device 14 will be set for actuation. Otherwise, the position E corresponds to the cruising or drive position "D" of the transmission, in which the engine is not cut off automatically. The actual cut-off of the engine in the "E" position of the gearshift lever is triggered by a further switch 24 upon release of the accelerator pedal. During this cut off the transmission suitably changes to its idling state. Restarting of the engine occurs when the accelerator pedal is actuated again and switch 24 is again closed. The engine speed can be regulated for synchronism of the engaging clutch in a conventional manner during this restarting of the engine.

The fact that engine cut-off is possible only in the particular selector level position contributes to the avoidance of constant engine cut-off which, during certain operating phases, could possibly be disturbing.

While the invention has been particularly shown and described with reference to preferred embodiments thereof, it will be understood by those skilled in the art that various changes in form and details may be made therein without departing from the spirit and scope of the invention.

I claim:

1. In a vehicle having an internal combustion driving engine, a manually operated transmission connectable to the driving engine, and a shift lever for controlling the manually operable transmission and having a neutral position, the improvement comprising a control device responsive to placing of the shift lever in the neutral position to cut off the driving engine.

2. A vehicle as claimed in claim 1 further including a time-delay element which permits cut off of the driving engine only after a predetermined period of time has elapsed since the shift lever entered the neutral position.

3. A vehicle as claimed in claim 1 or 2, wherein that the control device is actuated as a function of the engine temperature.

4. A vehicle as claimed in claim 3 further including a temperature switch whose operation is dependent upon the engine temperature, said switch releasing the control device for actuation only when a predefined engine temperature has been exceeded.

5. A vehicle as claimed in claim 1 or 2, further including a manually-actuable control switch for preventing actuation of the control device until the control switch is actuated.

6. A vehicle as claimed in claim 1, wherein the control device is rendered in such a manner that on displacement of the lever out of the neutral position, starting of the driving engine is initiated.

7. A vehicle as claimed in claim 1, wherein the transmission includes first and second gears, and the control device is rendered in such a manner that on displacement of the shift lever into the shift paths associated with the first and second gears, starting of the driving engine is initiated.

* * * * *